March 9, 1965     D. STANIMIROVITCH     3,172,783
METHOD FOR PROPERLY DIMENSIONING ELECTRIC STORAGE
CELLS AND STORAGE CELLS REALIZED THEREBY
Filed Jan. 17, 1962

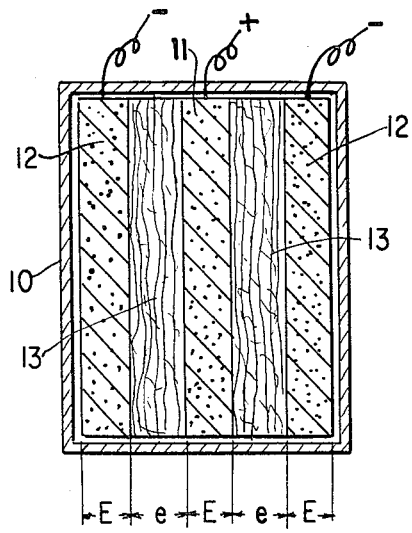

Fig. 1

E = ELECTRODE THICKNESS.

e = GAP.

C = TOTAL ELECTRODE CAPACITY.

K = COEFFICIENT OF POROSITY OF MATERIAL IN GAP BETWEEN ELECTRODES.

$\alpha$ = VOLUME OF ELECTROLYTE PER UNIT OF CAPACITY NECESSARY TO INSURE HIGH RATE DISCHARGES.

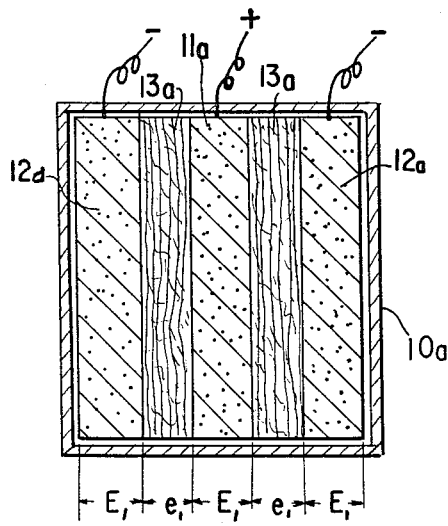

Fig. 2

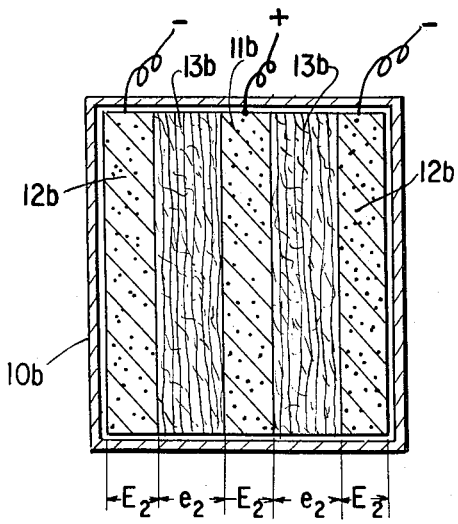

Fig. 3

INVENTOR
DOUCHAN STANIMIROVITCH
BY
Kenyon & Kenyon
ATTORNEYS

United States Patent Office 3,172,783
Patented Mar. 9, 1965

3,172,783
METHOD FOR PROPERLY DIMENSIONING ELECTRIC STORAGE CELLS AND STORAGE CELLS REALIZED THEREBY
Douchan Stanimirovitch, Paris, France, assignor to Societe des Accumulateurs Fixes et de Traction (Societe Anonyme), Romainville, France, a company of France
Filed Jan. 17, 1962, Ser. No. 166,756
Claims priority, application France, Jan. 27, 1961, 851,077
1 Claim. (Cl. 136—6)

The present invention relates to electric storage cells and more especially to alkaline storage cells whether or not they are gas-tight which are intended to have high discharge rates and contain an amount of electrolyte which is adequate during high rate discharge so that the active materials of its electrodes can instantaneously absorb the required amount of water. It also relates to a method for determining the parameters of such cells and particularly the thicknesses of their electrodes and the gap between these electrodes when selected adequate amounts of electrolyte are present between electrodes of opposite polarity so that during a high rate discharge of such cells the active materials of the electrodes thereof can instantaneously absorb the required amount of water. It further relates to a method for ascertaining the relationship between electrode thickness and gap when either is varied or when the porosity coefficient of the medium or separator material in such gap between said electrodes is varied or when the capacity of an electrode per unit of volume of said electrode is varied.

An object of the present invention is a method for properly dimensioning electric storage cells, more especially alkaline cells, whether or not gas-tight and which are intended for use at high discharge rates and which possess between their electrodes of opposite polarities an adequate amount of electrolyte, so that during a high rate discharge the active materials of the electrodes can instantaneously absorb the required amount of water needed for complete discharge.

This method is more specially characterized in that it comprises giving values according to the following equations to the thickness of the electrodes and to the gap between two adjacent electrodes of opposite polarities, namely, $$\frac{e}{E} = \alpha \frac{r}{2k}$$

when

E is the thickness of the electrode,
e is the distance between two adjacent electrodes of opposite polarities,
r is the capacity of an electrode per unit of volume of the said electrode (volumetric capacity),
α is the volume of the electrolyte available between the electrodes per unit of capacity, and
k is the coefficient of porosity of the medium or of the material situated between two electrodes of opposite polarities.

This method has been discovered as a result of research work on the amount of electrolyte necessary in a storage cell. The notion of the importance of the amount of electrolyte has been neglected heretofore in practice probably because in conventional alkaline batteries the problem of very high discharge rates did not exist since the alkaline batteries were considered as unfit for high discharge rates.

In these circumstances, there was no reason for worrying if the electrolyte underwent some changes during the charge and the discharge because a large amount was used (from 10 to 20 ml. per amp.-hr.). Förster as well as Zedner have shown that the hydration states of the active materials of an alkaline storage cell vary during the charge and during the discharge. More especially, the electrolyte gains water during the charge and loses it during the discharge. This variation of the amount of water is about 1 ml. per amp.-hr. As a consequence, if, during a discharge at a very high rate the active materials of the electrodes do not immediately receive this amount of water required for performing a complete discharge, this discharge will be stopped. It is therefore necessary that a minimum amount of electrolyte, at least 1 ml. per amp.-hr. and preferably 2 ml. per amp.-hr., be present between the electrodes. On the other hand, when an insufficient amount of electrolyte is provided, due to the differences in the concentrations between the cathodic compartment and the anodic compartment, there is the risk that the electrolyte will assume a concentration different from the optimum one near the anode as well as near the cathode, the optimum concentration being initially chosen by the manufacturer such as to give the minimum resistivity to the electroylte.

These very important factors may explain the failures obtained in using very thin separators, the thickness of which is in the range of from 0.10 to 0.20 mm., for cells having sintered electrodes, the thickness of which is 2 mm. or more.

It is by starting from this notion of the requirement for a minimum amount of electrolyte that it has been possible to determine in a completely general way the characteristics of a storage cell which must meet the requirements of high rate discharges.

Other objects and features of the invention will become apparent from the following specification and the accompanying drawings, wherein:

FIGURE 1 is a vertical section of a storage cell embodying the invention;
FIGURE 2 is a similar vertical section of another storage cell embodying the invention, and
FIGURE 3 is a similar vertical section of still another storage cell embodying the invention.

A few preliminary notions must first be called to mind in order to determine the state of knowledge in the manufacture of high power and high energy storage cells.

To this end, it has been acknowledged that the electrodes should present a very large conductive surface area on which the active materials must be arranged in very thin layers so that they can wholly, simultaneously and instantaneously take part in the electrochemical reactions of charge and discharge. It is, moreover, necessary that the electrode be very porous so that the electrolyte be present everywhere and that the ions may reach the active materials in their entirety.

It is more particularly the case of sintered carrier electrodes which preferably are thin.

Moreover, the internal resistance of a storage cell is rightly considered as an essential parameter for obtaining high power discharges. Although it is very simply defined by the formula $$R_o = \frac{E_o - V_o}{I_o}$$

where $R_o$ is the internal resistance, $V_o$ is the voltage, $E_o$ the electromotive force and $I_o$ the discharge current, it depends upon a series of parameters. As a first rough estimate they are:

The electrical resistance,
The ionic resistance,
The diffusion of the electrolyte, and
The polarization, among other things.

As a consequence, there are a number of practical requirements to be complied with such as to:

Decrease the distance between the electrodes;
Increase the areas of electrochemical exchanges;
Use highly porous electrodes so that the electrolyte can easily diffuse;
Use thin electrodes;
Use capillary separators; and
Use an electrolyte having the maximum conductivity.

Even when all the known requirements or factors which have been listed above are complied with in the manufacture of storage cells, the problem of having high power and high energy storage cells has not been securely resolved, since the results have not been such as could be expected. These results have been very unsteady and disappointing.

One fact has been overlooked. This was that in the realization or construction of such a storage cell the man skilled in the art had to take into account all the important factors. It must be noted that these factors are not usually independent from each other. It is possible that a factor does not give its full effect if some conditions concerning other factors are not fulfilled. It must also be noted that one neglected factor is enough to prevent obtaining the expected result, even if cell conditions relating to the other factors have been suitably fulfilled. Thus, it is required that the distance between the electrodes be the smallest possible so that the internal resistance be lowered (decrease of the length of the ion path, hence increase of the rate of the electrochemical reactions). However, no wholly satisfactory result has been obtained by sticking to this course.

It has been found by searching for the causes of these failures that actually a mathematical and very general definition of the important factors of the storage cell structure could be given by the following reasoning:

Referring to the drawing and first to FIGURE 1, a storage cell casing 10 is shown containing therein a positive electrode 11, two negative electrodes 12, two separators 13 interposed between the electrodes, and electrolyte 14, situated between the electrodes and made, for example, of sodium or potassium hydroxide. The electrodes 11 and 12 may, for example, be of the sintered metal type having respectively active positive and active negative materials of conventional type incorporated therewith in any of the known ways. The separator 13 may be a conventional alkali resistant porous medium of any conventional type or may be omitted entirely as long as the electrodes 11 and 12 are properly spaced from each other.

Let E be the thickness of an electrode 11 or 12, S its effective area, i.e., the area which bears the active materials, $r$ its volumetric capacity, i.e., its capacity per unit of volume, and C its total electrical capacity.

On the other hand, let $e$ be the gap between two adjacent electrodes of opposite polarities, $k$ the coefficient of porosity of the medium filling this space or gap (with or without separator) and $\alpha$ the volume of electrolyte per unit of capacity necessary to ensure high rate discharges.

Supposing that an electrode, for example the positive electrode 11, is immersed in or surrounded by electrolyte 14 on both its faces, the volume V of electrolyte can be defined by the following relation:

(1) $\qquad V = 2kSe$

This electrode 11 having a capacity C, and the minimum volume of electrolyte per unit in ml./amp.-hr. being $\alpha$, V may be defined by another relation (2) $\qquad V = \alpha C$ The capacity of an electrode 11 may be defined by the following relation (3) $\qquad C = rES$ which gives (3a) $\qquad V = 2KSe = \alpha C = \alpha rES$ or else (4) $\qquad \dfrac{e}{E} = \dfrac{\alpha r}{2k}$ and (4') $\qquad e = \dfrac{E\alpha r}{2k}$ This equation is found to have a very general form and may rightly be considered as defining the fundamental relation which must exist between the main components of a storage cell, more especially of the high rate discharge type.

The applications of this ascertained fact and of the relation found are, of course, very numerous. Some of them will be described, but not in a limiting way.

Refering now to FIGURES 2 and 3, two different storage cells similar to the cell of FIGURE 1, are shown, respectively comprising casings 10a, 10b containing positive electrodes 11a, 11b (with thickness $E_1$ and $E_2$ respectively) and negative electrodes 12a and 12b (with thickness $E_1$ and $E_2$ respectively) with separators 13a 13b (with thicknesses $e_1$ and $e_2$ respectively) and containing electrolytes 14a and 14b.

By taking the two storage cells of FIGURES 2 and 3 showing factors $e_1$, $E_1$ and $e_2$, $E_2$ and by supposing that the factors $r$ and $k$ are respectively the same in both cells, the following relations may be written utilizing Formula 4' above.

(5) $\qquad e_1 = \dfrac{E_1 \alpha r}{2k}$ (6) $\qquad e_2 = \dfrac{E_2 \alpha r}{2k}$ whence (7) $\qquad e_2 = e_1 \dfrac{E_2}{E_1}$ This formula expresses the rule that the thickness of the electrode plates and the gap distance between two adjacent electrodes of opposite polarities are proportional. If one of these components varies the other must be proportionally altered irrespective of the effective area of the plate.

If the value of $r$ and $k$ are not the same in both cells, having the values $r_1$, $k_1$ and $r_2$, $k_2$, respectively, the following general relation may be written:

(7') $\qquad e_2 = e_1 \dfrac{E_2 r_2 k_1}{E_1 r_2 k_2} = e_1 \dfrac{E_2}{E_1} A$ where A is a coefficient depending upon the $r$ and $k$ values.

Another interesting fact may be observed by supposing that the electrode thicknesses $E_1$ and $E_2$ are the same and the volumetric capacities $r_1$ and $r_2$ of the plates are the same.

If the two separators or the two different spaces or gaps between the electrodes $e_1$ and $e_2$ are different and have different porosities $k_1$ and $k_2$, the following relations are found:

(8) $\qquad e_1 = \dfrac{Er\alpha}{2k_1}$ (9) $\qquad e_2 = \dfrac{Er\alpha}{2k_2}$ hence, if $\alpha$ is the same for both

(10) $\qquad e_2 = e_1 \dfrac{k_1}{k_2}$

Or more generally (10') $\qquad e_2 = e_1 \dfrac{k_1}{k_2} B$ where B is a coefficient depending on the values $r_1$ and $r_2$ of $r$.

This expresses another important rule which may be put in practice, viz. that the thickness of the separator must be in inverse ratio to its porosity. Two concrete examples are given hereafter:

*Example 1.*—If in a storage cell electrode plates 11 and 12 have an effective area S which is 216 square centimeters, a thickness E of 2.1 mm. (0.21 cm.), and the cell has the capacity C of 12 amp.-hrs., its coefficient $r$ is computed by Formula 3 above. Thus, $$r = \frac{C}{ES}$$

or $$r = \frac{12}{216 \times 0.21} = 0.265$$

If it has a separator having a thickness $e$ of 0.2 mm. and having a porosity defined by $$k = 0.75 \ (75\%)$$

and if, moreover, the volume $\alpha$ of electrolyte necessary to ensure high rate discharges is taken at its average value, viz. 1.5 ml./amp.-hr., the following relationship of $e/E$ value is found by using the hereinabove mentioned Formula 4:

$$\frac{e}{E} = \frac{1.5}{2} \cdot \frac{0.265}{0.75} = 0.265$$

Thus, in the present case, for an electrode, 2.1 mm. thick, the most suitable separator must be $$2.1 \times 0.265 = 0.56 \text{ mm.}$$

thick the porosity of such separator being 75%. Any variation in the thickness of the electrode must result in a variation of the separator thickness in a ratio from 26 to 27% ($e/E \times 100$).

*Example 2.*—If a storage cell has the same factors, as Example 1, e.g. $E_1 = E_2 = E$, $r_1 = r_2 = r$ and $\alpha_1 = \alpha_2 = \alpha$, and if the porosity $k_2$ of the separator must be changed, the above-mentioned Formula 10 can be applied for determining the thickness of the new separator.

If the former separator has the thickness $e_1 = 0.2$ mm. and the porosity factor $k_1 = 0.75$ and the new separator has a lesser porosity factor $k_2$ such as 0.60, its thickness $e_2$ will be found from Formula 10 to be $$e_2 = \frac{0.2 \times 0.75}{0.60} = 0.25 \text{ mm.}$$

*Example 3.*—If a second cell is to be constructed without changing anything in the active materials, or in the effective areas $S_2$ of its electrode, or in the porosity factor $k_2$ of the given separator of the second cell, the thickness of the separator must for some reason be changed, the Formula 7 should be applied to determine the required thickness $E_2$ of its electrode $$e_1 = 0.2 \text{ mm.}$$

$$e_2 = 0.25 \text{ mm.}$$

$$E_1 = 2.1 \text{ mm.}$$

Thus, the thickness of the new electrode will have to be $$E_2 = E_1 \frac{e_2}{e_1} = 2.1 \ \frac{0.25}{0.20} = 2.62 \text{ mm.}$$

It can be seen from the formulae and by examples given that it is possible to produce storage cells meeting requirements for high rate discharge and also to determine structural features of additional high rate discharge cells when variations in known parameters are required because of manufacturing conditions or of available materials.

The invention, therefore, also includes as new industrial products the storage cells obtained by the application of the above-described formulae and method for determining the same, whether or not the said alkaline storage cells are gas-tight and whether or not the electrolyte is immobilized therein.

It is well understood that the invention is in no way limited to the embodiments or examples described which have been merely given as illustrations but that all variations within the scope of the appended claim are contemplated.

What is claimed is:

In the process for manufacturing an alkaline storage cell having a high rate of discharge which includes electrodes of opposite polarity spaced apart by a gap, alkaline electrolyte and a separator in said gap, the steps comprising measuring the electrode thickness, measuring the volume of the electrodes, measuring the coefficient of porosity of the separator, and thereafter interposing a separator having a porosity factor $k$ and a thickness $e$ given by the equation $$e = \frac{E \alpha r}{2k}$$

wherein $e$ is the gap between two adjacent electrodes of opposite polarity

E is the electrode thickness $r$ is the capacity of an electrode per unit of $$\text{electrode volume} = \frac{C}{ES}$$

where C is the cell capacity and S the effective area of the electrode $k$ is the coefficient of porosity of said separator in the gap, and $\alpha$ is the volume of electrolyte available between the electrodes per unit of capacity and has a value in the range of 1 and 2 ml.—amp.-hr., between said electrodes of opposite polarity.

References Cited by the Examiner

UNITED STATES PATENTS

| | | | |
|---|---|---|---|
| 2,594,714 | 4/52 | Andre | 136—34 |
| 2,810,775 | 10/57 | Raphael et al. | 136—145 |
| 2,991,324 | 7/61 | Vogt | 136—13 |

OTHER REFERENCES

Vinal: Storage Batteries, 4th edition, pages 159–161 (Properties of Alkaline Electrolytes) and page 116.

JOHN H. MACK, *Primary Examiner.*

JOHN R. SPECK, MURRAY TILLMAN, WINSTON A. DOUGLAS, *Examiners.*